United States Patent [19]
Kingsley

[11] Patent Number: 4,844,929
[45] Date of Patent: Jul. 4, 1989

[54] RAPID NONFERMENTATIVE PICKLING PROCESS

[75] Inventor: I. Stephen Kingsley, Kew Gardens Hills, N.Y.

[73] Assignee: Cusinecrafts, Inc., Ridgewood, N.J.

[21] Appl. No.: 765,177

[22] Filed: Aug. 12, 1985

Related U.S. Application Data

[63] Continuation of Ser. No. 588,891, Mar. 12, 1984, abandoned.

[51] Int. Cl.$^4$ ............... A23B 7/156; A23L 1/221; A23L 3/34
[52] U.S. Cl. ............... 426/326; 426/335; 426/532; 426/615
[58] Field of Search ............... 426/615, 650, 652, 321, 426/324, 326, 331, 638, 654, 335, 532, 49.52

[56] References Cited

U.S. PATENT DOCUMENTS

| | | | |
|---|---|---|---|
| 3,985,890 | 12/1976 | Brown | 426/643 |
| 4,343,821 | 8/1982 | Rose | 426/652 |
| 4,352,827 | 10/1982 | Fleming et al. | 426/615 |
| 4,353,930 | 12/1982 | Hrahara | 426/615 |

OTHER PUBLICATIONS

Hannigan, K., 'No Fermentation Needed with Pickling Powder', *Food Engineering*, Mar. 1983, p. 59.
Chemical Abstract No. 96: 216299j; Sistrunk, W. A. et al. 'Influence of Processing Methodology on Quality of Cucumber Pickles'1982, p. 605.
Binsted et al., *Pickle & Sauce Making*, 2d ed., Food Trade Press Ltd., Longon; 1962; pp. 25–28 and 78–87.

*Primary Examiner*—Elizabeth C. Weimar

[57] ABSTRACT

The invention relates to a rapid, fermentation-free pickling method through the use of pickling powders containing all necessary ingredients and flavors that make a one step, rapid and very simple pickling process, to prepare both low: 0.8% salt, and regular: 3–4% salt finished pickled products. The nature of this invention allows for either the full or partial replacement of current pickling methods and losses inherent to these processes, in addition to providing products of consistently high quality, either at regular, or at about 75% lower salt content than currently available products have (as eaten). It is applicable to any manufacturing scale, from large scale processing to home preparation, and eliminates the basic processing steps down to packaging. The basis for these benefits is the composition of the pickling powders, which is a combination of acidulants, spices, flavors, salt and calcium salts, and the rapid, uninterrupted pickling process, which requires 3 to 7 days for low salt, 3 to 10 days for regular pickled products, and is done in a clean, enclosed space. An added benefit is that the apparent saltiness of the finished low salt products is reasonably close to the saltiness provided by 3–4% of salt in currently available products.

20 Claims, 4 Drawing Sheets

RAPID NONFERMENTATIVE PICKLING PROCESS

This application is a continuation of application Ser. No. 588,891, filed Mar. 12, 1984, abandoned.

BACKGROUND OF INVENTION

Current state of art pickling fermentation/salt brining processes have three major negative factors:

1. A very high brine salt content (e.g., for pickling cucumbers the brine is 5–8%, by weight, salt during fermentation, and 8–16% salt during storage). The high brine salt content during storage necessitates a "desalting" step prior to packaging/ shipping, to reduce the salt level to 3–4%. Additionally, brine disposal can harm the environment. Moreover, at 3.5% final salt content, an average piece of pickled cucumber, weighing 3 oz (85 g) contains 2.9 g NaCl. This amount of salt is 50% of the recommended maximum daily intake of salt for adults (6. g). Low salt products of this invention can have an average salt content of 0.8% by weight (i.e. 0.68 g in 3 oz (85 g)) or 77% less than traditional pickles. With the current interest in reducing salt intake, a 70–80% decrease in the salt content of a widely enjoyed group of foods is certainly desirable.

2. An uncontrolled process. Uncertainties inherent in the pickling/fermentation process result in inconsistent product quality and frequently an unmarketable product.

The uncertainties are due to:

(i) natural (or "wild") fermentation. Fermentation can begin before controlled fermentation conditions are established, i.e., salt concentration, pH, buffer capacity, etc. The difficulty in cleaning/sanitatizing green stock is one reason for natural fermentation.

(ii) Enzymatic softening (pectinolytic, etc). During the initial stages of brining/fermentation, the green stock's endogenous enzymes can break-down the green stock's structural components.

(iii) Structural damage and bloating. Microorganisms, initially present in the green stock—i.e., gram positive and negative bacteria, yeasts, oxidative yeasts and molds—release gases which cause most of the structural tissue damage and bloating in the traditional pickling-/fermentation process. Additionally, respiration by the green stock itself can produce carbon dioxide and hydrogen.

(iv) Between 5%, in a controlled traditional process, and 40%, in a "natural" traditional fermentation process, of the product is structurally damaged or bloated. The damaged portion is either used to make relish or is a complete loss. Further enzymatic softening and fermentation can occur after "desalting". Pasteurization and/or the addition of chemical preservatives (i.e. Na Benzoate) is required to prevent further enzymatic or fermentative processes once the brine level is reduced in traditional pickling fermentation processes.

3. A complicated and time consuming process. For example, traditional pickling/fermentation of cucumbers involves:

Cleaning the cucumbers with water and chlorine sanitation prior to brining;

Acidification of the green stock (optional);

Nitrogen purging of the green stock (optional);

Salting - concentration between 5–8% salt is added to the pickling solution to adjust the pH of the pickling solution;

Buffering (optional);

Addition of the "fermenting" culture (optional);

Fermentation—may require from 7–12 days to 90 days to complete;

Further salting a 8–16% brine solution is needed to preserve the "pickle" during storage which may last for up to 1 year in general;

"Desalting" prior to being shipped to the consumer, the "pickle" must be "desalted" to reduce the brine product salt content to 3 to 4%;

Packaging the "pickle" in jars or cans; and

Pasteurization.

In contrast, the one step nonfermentative brining process of the present invention reduces or eliminates these negative factors. Thus the process of the present invention provides greater manufacturing economies while producing a more desirable product. Moreover, the process of the present invention can, optionally, be combined with any combination of prior art pickling/fermentation steps.

For illustrative purposes, the present disclosure sets forth practices and process variables and mechanisms for making "dill pickles" from cucumbers.

Current pickling methods are summarized in the following table:

| MATERIAL | STEP | PROCESS VARIABLES | | | RESULT |
|---|---|---|---|---|---|
| | | LOCATION | CONDITION | TIME | |
| GREEN STOCK (pickling cucumbers) | WASHING | Conveyor | Ambient 40–90 F | 0.2–0.5 hr | CLEAN RAW MATERIAL |
| CHLORINE | SANITIZING* | Tank | Varies from 1 to 5 mg/ liter | Tank filling time + 0.5–1 hr | FERMENTATION READY GREEN STOCK |
| ACETIC ACID Potassium Sorbate | ACIDIFICATION* | Tank Tank | to pH 3.0 | 18–24 hrs | FERMENTATION CONDITIONING |
| Nitrogen or AIR | PURGING* | Tank | Ambient 40–90 F | 0.5–1 hr | WHOLE FRUIT TISSUE PROTECTION |
| SALT | 1st SALTING | Tank | to 5–8% | 0.5–1 hr. | CONDITIONING AND PROTECTION |
| SODIUM HYDROXIDE Solution | BUFFERING* | Tank | to pH 5.0 | 0.5–1 hr | FERMENTATION CONDITIONING |
| LACTO- | CULTURE | Tank | Ambient | 0.1–0.2 hr | UNIFORM |

-continued

| MATERIAL | STEP | PROCESS VARIABLES | | TIME | RESULT |
| --- | --- | --- | --- | --- | --- |
| | | LOCATION | CONDITION | | |
| BACILLUS PALANTARUM | ADDITION* | | | | FERMENTATION |
| LACTO-BACILLUS PALANTARUM | FERMENTATION | Tank | Exterior-ambient interior changing | 7-12 days to 90 days | DEVELOP DESIRABLE PRODUCT CHARACTERISTICS |
| SALT | 2nd SALTING | Tank | to 8-16% | 0.5-1 hr. | CONDITIONING FOR LONG TERM STORAGE |
| SALT | STORAGE | Tank | Ambient temp. 8-16% salt conc. 0.6% lactic acid 0.2% acetic acid | up to 1 year | PRESERVATION/ SOFTENING PREVENTION |
| WATER, SPICES, SODIUM BENZOATE | "DESALTING" | Tank | to 3-4% salt conc. | 0.5-1.5 hrs. | FINISHED PRODUCT |
| PLASTIC/ WOOD DRUMS | BULK PACKAGING | 55 Gal drum | Ambient | Varies by processor | FINISHED PRODUCT |
| DIFFERENT GLASS SIZE JARS or CANS | RETAIL PACKAGING | Glass jars or cans | Ambient | Varies by processor | FINISHED PRODUCT |
| | FILLING | | Under vacuum after capping | | |
| | PASTEURIZING and/or ADDING PRESERVATIVE(S) DURING "DESALTING" | | Up to 250 F 2.5 min. | | |

*Optional

BRIEF DESCRIPTION OF THE DRAWINGS

FIG. 1 illustrates the traditional fermentation pickling process for cucumbers. In the traditional cucumber pickling process, *Lactobacillus plantarum* (1) pass through the skin of the green stock (2) and enter into the inner tissues of the green stock (3). The green stock is immersed in a 5-18% sodium chloride brine which diffuses into the green stock during fermentation (4). During the fermentation process, *L. plantarum*, which can tolerate high salt levels, metabolizes carbohydrates both within (5) and without the green stock. This *L. plantarum* metabolism produces lactic acid (6) (up to 0.6% of the brine) and acetic acid (7) (up to 0.2% of the brine), which metabolic products diffuse out of the green stock. Also during fermentation, other materials such as soluble tissue components (8) including sugars, diffuse out of the green stock.

Figure 1:
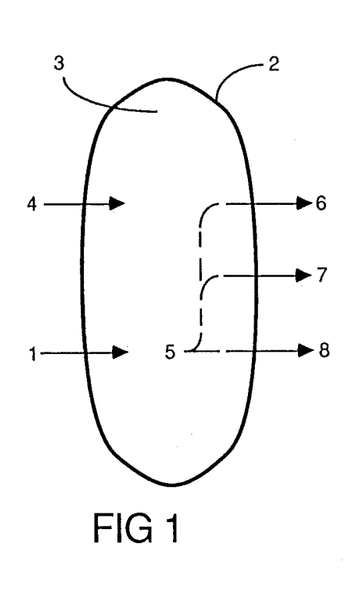
FIG. 1 is a pictorial representation of the traditional fermentation mechanism for pickling.
Figure 2:
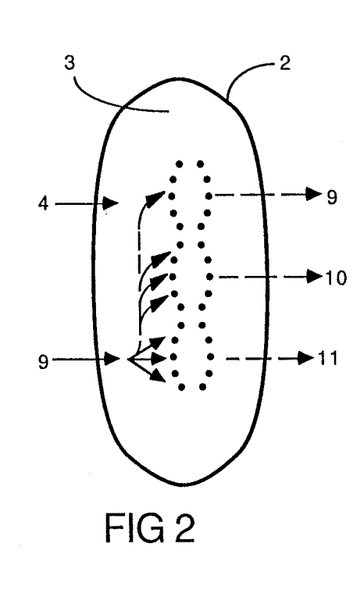
FIG. 2 is a pictorial representation of how bloating occurs in the traditional fermentation, pickling process.

FIG. 2 illustrates another series of steps that occur concurrent with fermentation during the traditional fermentation pickling process. In addition to producing lactic and acetic acids, *L. plantarum* metabolism produces carbon dioxide. As this carbon dioxide is in addition to the carbon dioxide, nitrogen and oxygen initially present in the green stock and brine, the brine will contain 6% or more carbon dioxide. As the carbon dioxide can diffuses into and out of the green stock (9) much faster than nitrogen and oxygen can diffuse out of the green stock—carbon dioxide is much more water soluble than either nitrogen (10) or oxygen (11)—the entrapped nitrogen and oxygen rupture the soft middle sections of the green stock and forms voids.

Figure 3:
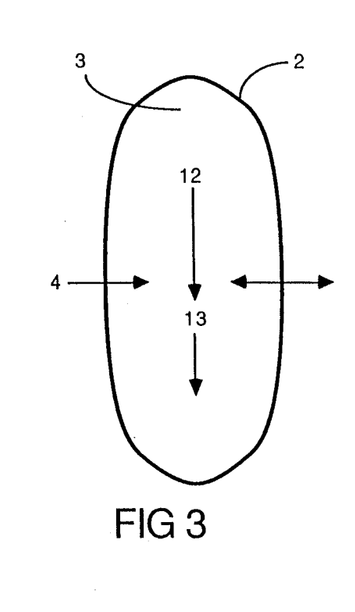
FIG. 3 is a pictorial representation of how enzymatic activity softens both the green stock and the "pickle" in the traditional fermentation pickling process.

FIG. 3 illustrates how the green stock is softened both before and after fermentation in the traditional pickling process. Prior to fermentation and during the slow initial diffusion of sodium chloride into the green stock, the green stock's endogenous polyglacturonase (12) hydrolyzes pectins (13) within the green stock, breaking down the green stock's structural components. After fermentation, when the "pickle" is in a 3-4% salt brine, the green stock's endogenous polyglacturonase activity can resume and further break-down structural components of the green stock.

DESCRIPTION OF THE INVENTION

The rapid (3 day to 7-10 day) one step nonfermentative pickling process of the present invention comprises dissolving water/acid soluble compounds and dispersing water/acid insoluble ingredients so as to form an aqueous pickling media. The to be pickled foodstuff or green stock is immersed in said aqueous pickling media. The method of the present invention can be combined with prior art practices or used alone. The method of the present invention can be used to pickle a number of vegetables and meat/meat based products such as cucumbers, red and green peppers, green tomatoes, corn, cabbage, mushrooms, cauliflower, carrots, beans, beets, olives, horseradish, as well as calf/beef tongues, sausages, wieners and some small parts of pork. As cucumbers, followed by cabbage, peppers and calf/beef tongues are the most commonly pickled foodstuffs, the specific formulations/flavors disclosed herein are for these products. Nevertheless, the basic pickling method of the present invention is applicable to all currently or potentially pickled fruit, vegetable and meat based pickled products on any manufacturing scale.

The process of the present invention is based on direct acidification/curing/preservation of suitable vegetables, fruits and meats (hereinafter green stock). This process utilizes the following functionalities in the process of the present invention.

1. Fast and full absorption (to equilibrium) of acidulants, salt, calcium salts, and solubilized spice and flavor enhancer compounds (and optionally flavor and preservative), by establishing and maintaining an even diffusion flow in and out of the green stock by the use of calcium salts.

2. The natural antimicrobial and antifungicidal properties of certain spice phenolic compounds, such as eugenol and chavicol in cloves and bay. Essential oils of the Myrtaceae family (eugenol in particular representing the bulk of these oils, along with other constituent phenolic compounds) exhibit antimicrobial activity against gram positive and negative bacteria, acid-fast bacteria, and fungi. A concentration of 35 ppm or more eugenol in the brine prevents fermentation in previously unused, completely clean and closed environments, i.e. jars, cans or plastic pails/drums.

Figure 4:
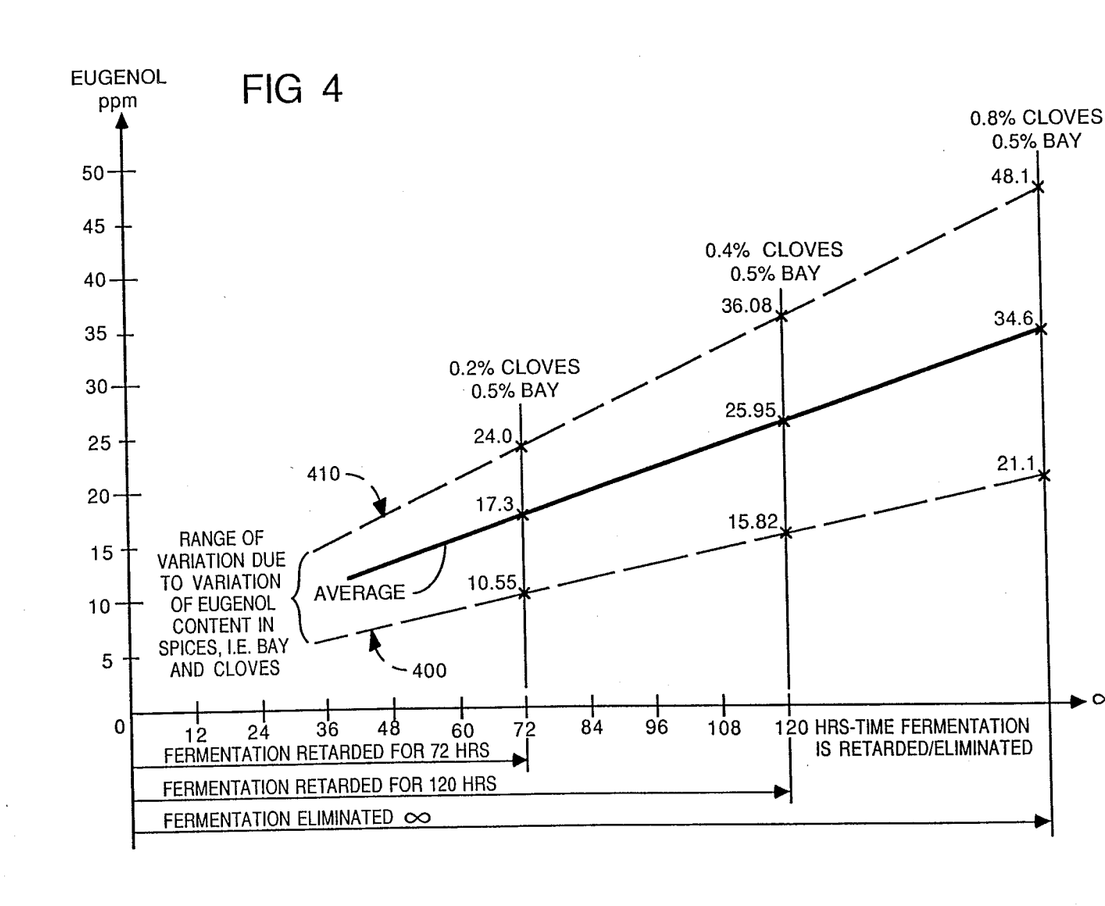
FIG. 4 is a graphic representation of the effect of eugenol levels on fermentation.

FIG. 4 shows the relationship between the level of brine eugenol and fermentation. The data in FIG. 4 was collected in a series of experiments using the process of the present invention. Each of the experiments represented in FIG. 4 was conducted in a previously unused, clean, closed container and with fresh brine having 760 ppm, or more, calcium and 0.3% acid. While all of the experiments represented by FIG. 4 were carried out at a temperature between 40° and 160° F., most of these experiments were carried out between 50° and 90° F. Moreover, the brine solutions contained 3% solids, which solids content was the basis for computing the solids fraction for each ingredient. As shown in FIG. 4, a 0.2% cloves and 0.5% bay (brine solids basis) admixture produced a brine containing between 10.55 and 24.0 ppm (brine solution basis) with an average of 17.3 ppm eugenol (this eugenol level retarded fermentation for 72 hours). Similarly, a 0.4% cloves and a 0.5% bay admixture produced a brine containing between 15.82 and 36.08 ppm with an average of 25.95 ppm eugenol (this level of eugenol retarded fermentation for 120 hours) foot. Fermentation was not observed in a brine comprising a 0.8% cloves and a 0.5% bay admixture (brine solids basis) which had between 21.1 and 48.1 ppm and an average of 34.6 ppm eugenol.

The eugenol variability in FIG. 4 reflects the variation in these spices' eugenol content.

Repeated use of the same container may lead to fungicidal activity from yeasts (Torula, Micoderma), fungi (*Aspergillus niger*, Penicillum) and molds due to increased microbe resistance to eugenol. To eliminate these resistant microbes, preservatives such as Sodium Benzoate may be used at levels of up to 1000 ppm of brine. Sodium Benzoate addition is particularly useful in the process of the present invention as its pKa is 4.2, an indication that it is most effective in high acid foods.

3. Acidulants may also have natural antimicrobial and antifungicidal properties based on the following interrelated phenomena:

A. Several species of microbes are unable to grow at a pH of 4.8 or less. Moreover, this low pH also speeds up the removal of reducing sugars and carbon dioxide gas from the green stock, which compounds are important for the traditional pickling/fermentation processes, but are not a part of the present invention.

B. The levels of lactic and acidic acids which follow natural fermentation—0.6% lactic and 0.2% acetic acids—inhibit the growth of most lactic and acetic producing bacteria, such as: *Streptococcus feacalis, Leuconostoc mesenteriodes, Lactobacillus brevis, Pediococcus cerevisae* as well as *Acetobacter xylinum*, etc. This inhibition is based on the tolerance-level of each strain to its own metabolitic end products.

C. Other acidulants, such as citric acid, tartaric acid, sodium diacetate and acetate also help preserve foodstuffs. Citric and polyphosphoric acids break down the lipid barrier of gram negative bacteria through chelation, increasing the sensitivity of these bacteria to other antibacterial compounds.

4. Calcium strengthens the green stock's texture, controls the diffusion rate of materials into and out of the green stock, and retards natural fermentation. Useful calcium materials comprise water/acid soluble calcium salts, such as calcium chloride, calcium nitrate, calcium sulfate, calcium oxide, and calcium acetate, lactate and gluconate. The calcium ions form a divalent cation salt with the carboxyl groups of the green stock's pectin.

It has now been discovered that the level of calcium in the brine needed to achieve a firm, chewy texture is around, or more than 760 ppm. About 48% of this calcium, or 363 ppm binds pectins in the green stock's tissues. This calcium is in addition to the calcium that is naturally present in the fresh green stock. The natural calcium level varies with the growing region, growing time, and cultivar.

Calcium ions binding of green stock pectinaeceous substances according to the process of this present invention results in the following interrelated phenomena:

A. Fast, even firming the green stock's tissues by cross-linking the large pectin strands with calcium. In the process of the present invention, equilibrium is reached after 72 hours of brining, at which time the green stock's calcium content is around 530 ppm. This calcium level also retards fermentation in regular (8-12% by weight), low (1-2%) a no salt (0%) brines. (In no salt brines, potassium chloride replaces sodium chloride.)

The following table shows how textural firmness is changed by the process of the present invention and a comparison is made to a cross-section of a commercially (retail) available whole dill pickle products. The measurements were done with a U.C. Fruit firmness tester Ametek LKG-14 gage having a 5/16" tip.

| Product | Firmness* (kg) |
| --- | --- |
| 1. Fresh whole cucumbers (Kirby type) | 11.4 |
| 2. Above after 72 hrs of pickling according to the process of the present invention | 11.1 |
| 3. Same after 4 month | 11.2 |

| Product | Firmness* (kg) |
|---|---|
| storage | |
| 4. Retail products, average (tested within 2 weeks of delivery to supermarket) | 7.7 |

*An average of 20 measurements

B. Steady, even diffusion of the water/acid soluble compounds and gas into and out of the green stock during the process of the present invention. The low solids increase in products made according to the process of the present invention as compared to products made by the current commercial methods confirms the contribution of calcium cross-linked pectinaecous tissues.

Typical solids contents for these products are shown in the next table:

| Product | Solids, %* | Change, % of % |
|---|---|---|
| 1. Fresh whole cucumbers (Kirby type) | 4.4 | 0(100%) |
| 2. Above after 72 hrs of pickling according to the process of the present invention | 5.1 | +16% |
| 3. Same after 4 months storage | 5.0 | +13.6% |
| 4. Retail Products, tested within 2 weeks of delivery to supermarket) | 6.7 | +52.3% |

*An average of 10 measurements

Additionally, the process of the present invention permits the pickling of large, whole pieces of vegetables, fruits and meats in very short times (3–10 days), which results in further savings. Importantly, in the process of the present invention, green stock comprising continuous compact inner tissues need not be sliced, diced, halved, quartered, etc. to achieve full brine absorption.

C. Brine calcium levels of 760 ppm or more retard fermentation. These calcium levels, in combination with eugenol at a concentration of at least 35 ppm in the brine, prevent fermentation in unused, clean, closed containers. The calcium maintains and strenghtens the uniform inner tissue structure of the green stock. The resulting green stock's structural integrity slows down the rate of diffusion of reducing sugars from the green stock into the brine.

Figure 5:
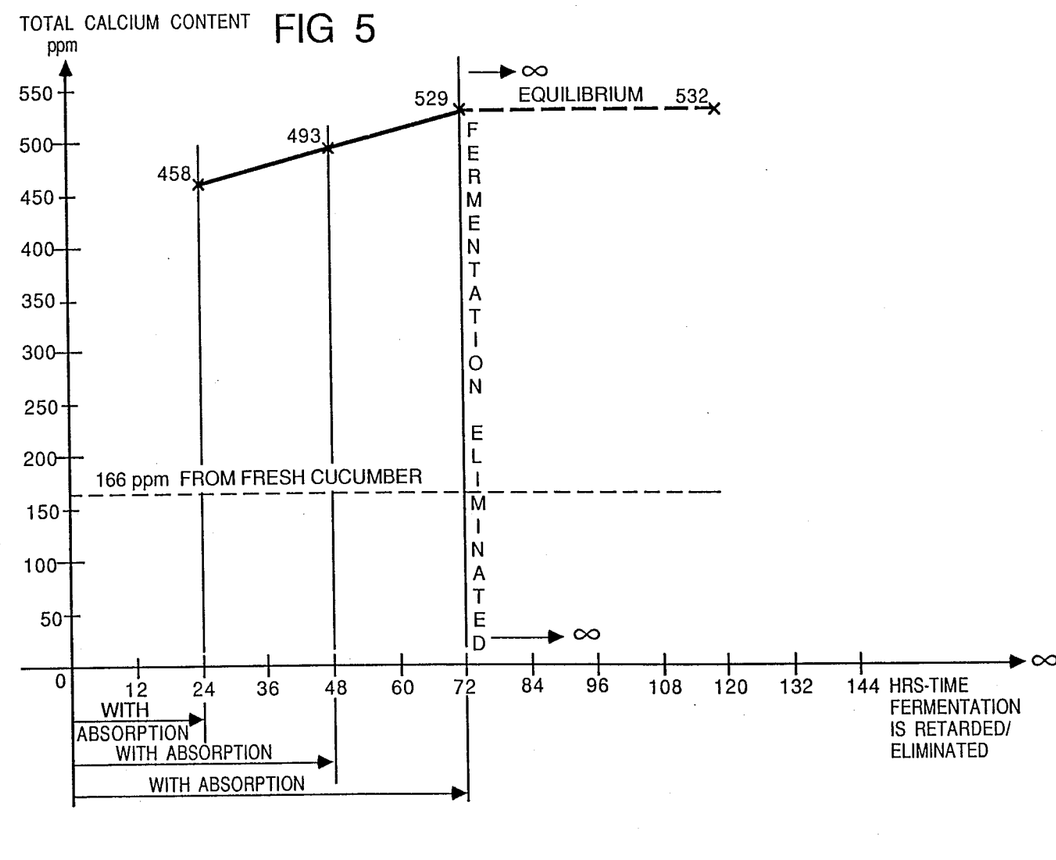
FIG. 5 is a graphic representation of the effect of calcium levels on fermentation.

FIG. 5 demonstrates the relationship between calcium level in the pickled product and brine fermentation retardation. The data in FIG. 5 was gathered from experiments using the process of the present invention. The experiments depicted in FIG. 5 were conducted in previously unused, clean, closed containers with fresh brine having 35 ppm, or more, eugenol and 0.3% acid. While all of the experiments depicted in FIG. 5 were carried out at a temperature between 40° and 160° F., most of these experiments were carried out between 50° and 90° F. Moreover, the brine solutions contained 3% solids, which solids content was used as the basis for calculating a solid ingredient percent. As shown in FIG. 5, the fresh green stock (cucumber) has an endogenous calcium level of 166 ppm of calcium. After 24 hours of processing according to the present invention, the green stock contains 458 ppm calcium; after 48 hours the green stock contains 493 ppm calcium; and after 72 hours, the green stock contains 529 ppm calcium. Eventually the green stock will absorb sufficient calcium to reach the equilibrium level of 532 ppm calcium. At a calcium level of 529 ppm, fermentation was not observed.

In clean, closed conditions at a temperature within the range of 45° to 80° F., the process of the present invention produces low-salt products within 72 hours and regular salt products within 72 hours to 10 days. These processes do not "lose" product and provide firm textured, "crunchy", freshly-made type products.

The process variables and mechanisms for making the low salt type dill pickles by the process of the present invention are given in the following tables.

| PROCESS VARIABLES (Low salt version) | | | | | |
|---|---|---|---|---|---|
| MATERIAL | STEPS | LOCATION | CONDITION | TIME | RESULT |
| GREEN STOCK (Pickling cucumbers) A. | WASHING | Tank/ Conveyor | Ambient 40–90° F. | 0.2–0.5 hr | CLEAN RAW MATERIAL |
| PICKLING POWDER and | ADDITION | Jar, can, pail or drum | Ambient 40–90° F. | 0.01–0.05 hr | START OF PROCESS |
| WATER | FILL CONTAINER TO TOP | Jar, can, pail or drum | (60–212° F.) | Depends on container size | START OF PROCESS |
| OR B. PICKLING POWDER SOLUTION (3.8%) plus | FILL CONTAINER TO TOP | Jar, can, pail or drum | " | Depends on container size | START OF PROCESS |
| LID/CAP | CLOSE/SEAL FULLY | Jar, can, pail or drum | " | 0.01–0.02 hr | START OF PROCESS |
| | DISSOLVE/ DISPERSE* | Jar, can, pail or drum | ** | 3 TO 10 days | |
| | PICKLE | Jar, can, | | | FINISHED PRODUCT |
| | STORE or | | | Up to 1 year | |

| PROCESS VARIABLES (Low salt version) | | | | |
|---|---|---|---|---|
| MATERIAL | STEPS | LOCATION | CONDITION | TIME | RESULT |
| | CONSUME | | | | |

Figure 6:
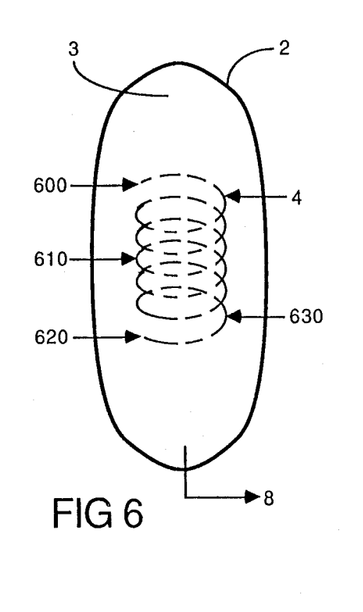
FIG. 6 is a pictorial representation of how the process of the present invention prevents fermentation of the green stock.

*BY SHAKING/ROTATION
**NaCl in brine: 1.86%
Acids brine: 0.56%
Eugenol in brine: 35 ppm
Ca+2 in brine: 760 ppm
NaCl in product: 0.85%
Ca in product: 530 ppm
Acids in product: 0.3%
MAY BE LACTIC, ACETIC, CITRIC, TARTARIC, FUMARIC, MALIC ETC. OR THEIR COMBINATIONS FIG. 6 illustrated how the process of the present invention prevents fermentation of the green stock. Once immersed in a brine according to the present invention, the calcium (600), eugenol (610), preservative (620) and acids (630) in the brine diffuse into the green stock along with salt which may be present in the brine. These components are rapidly and evenly absorbed into the green stock so as to prevent the green stock from fermenting. Moreover, this same brine prevents any of the water-acid soluble green stock tissues which enter the brine from fermenting in the brine.

Figure 7:
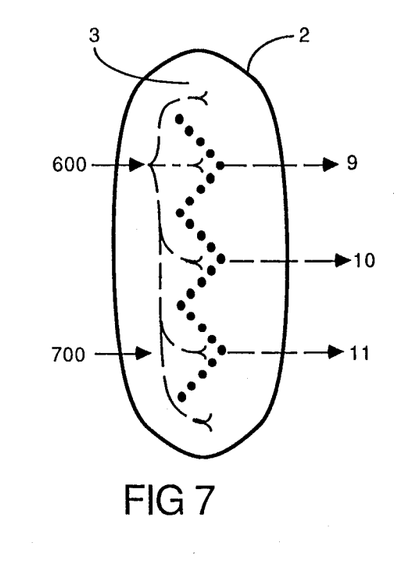
FIG. 7 is a pictorial representation of how the process of the present invention prevents bloating of the green stock.

FIG. 7 illustrates how the process of the present invention prevents bloating of the green stock. The constant absorption and binding of calcium ions to the green stock's pectinaceous tissues maintains its original intact continuous texture. This maintained structure allows only a very slow, controlled diffusion of gases out of the green stock and into the brine. Moreover, the brine itself, in the process of the present invention, is non-fermenting and thus does not produce and saturate the "pickle" with carbon dioxide. In sum, the non-fermentative environment (700) of the green stock in the process of the present invention does not lead to tissue rupturing, gas bubbles.

Figure 8:
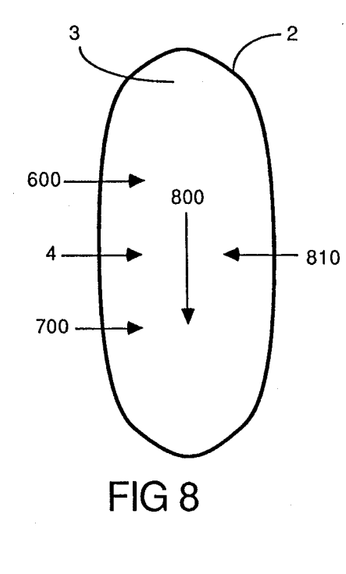
FIG. 8 is a pictorial representation of how the process of the present invention prevents softening of the green stock.

FIG. 8 illustrates how the process of the present invention acts to prevent softening of the green stock both during and after brining. During brining, calcium from the brine diffuses into the green stock and binds the green stock's pectin (800). The calcium binding of the green stock's pectin precludes pectinolytic hydrolysis, even in low salt brines.

After brining, according to the process of the present invention, the "pickled" product has the desired salt level for a finished product. Thus, there is no need to "desalt", repack or a combination thereof to reach the desired finished product salt level. The calcium bound to the green stock's pectin remains and assures that the product retains its firm texture throughout storage without any additional steps. (810: no change in the finished product's environment).

The process of the present invention prevents fermentation, bloating and softening simultaneously.

DESCRIPTION OF THE PREFERRED EMBODIMENTS

The process of the present invention is applicable to a variety of foods—fruit, vegetable and meat based green stock—as well as a variety of pickle types produces, i.e. Sour, Sweet-sour, Dill, Polish dill, Kosher dill, etc.

The following ingredient list shows the variety and functionality of ingredients useful in the present invention:

Acidulants: As a solid powder or in a crystalline form, with or without a carrier, as an anhydrous, mono-, di-hydrate or a water soluble salt, which, when solubilized, provides an acid moiety. Useful acidulents include Lactic, Acetic, Citric, Tartaric, Fumaric, Malic, Adipic, Ascorbic and Succinic acids, Sodium acetate and diacetate, and Glucono delta lactone.

Calcium salts and water/acid calcium soluble compounds (as firming and anti-fermentation agents): As a solid powder or in a crystalline form, in an anhydrous, mono- or di-hydrate form. Useful calcium materials include calcium chloride, oxide, sulphate, lactate, acetate and gluconate.

Salts (as humectants and flavoring agents): As a solid powder or in a crystalline form, in an anhydrous, mono- or di-hydrate form. Useful salts include: sodium chloride, potassium chloride, magnesium chloride, calcium chloride.

Spices (as flavoring, coloring and antimicrobial/fungicidal agents) in the following dry forms: ground, extracted and dried; with or without carriers and adjuncts; essential spice oils/flavors dried with or without carriers and adjuncts; from any parts and variety of the plants used. Without limitation, the following spices currently used in pickling are useful in the process of the present invention: basil, bay, celery, cloves, coriander, dill, garlic, marjoram, onion, black/white pepper, turmeric, and combinations thereof.

Flavors: every applicable, water/acid soluble single or compounded flavor in a dry powder or crystalline form, either from natural and/or artificial sources, with or without carrier or adjunct(s) i.e.: Vinegar, Polish dill, individual/combination spice flavors, etc.

Sweeteners (as flavorings and humectants): every applicable, water/acid soluble sweeting compound in dry powder or crystalline form, either of natural or artificial origin, including poly/di/mono-saccharides such as maltodextrins, sugar, fructose, glucose, xylitol and sodium, potassium and calcium saccharin, aspartame, etc.

Flavor enhancers: every applicable natural and/or artificial ingredient/compound of solid powder or crystalline form, with or without carriers or adjuncts added: i.e. mono-sodium glutamate (MSG); dry yeast; yeast extract; autolyzed yeast; miso; hydrolized plant and animal proteins; sodium inosinate and guanilate.

Powder flow/anticaking agents: every applicable, currently used ingredient/compounds: i.e. silica; silicagels and silicates; tri-calcium phosphate; microcyrstalline cellulose; vegetable oil and stearates; calcium sulfate; and hydrolized cereal solids.

Buffering agents: every applicable, water/acid soluble compound in dry powder or crystalline forms in the anhydrous, mono or di-hydrous state: i.e. mono-calcium phosphate and tri-sodium citrate.

Chemical preservatives (in addition to the hydroxy- and saturated alkyl carboxylacids set forth above as "acidulants") every applicable, FDA approved/regulated water/acid soluble solid compound, which functions best in a pH range between 2.5 and 4.5 as an antimicrobial, antifungal or antimycotic agent: i.e. sodium benzoate, calcium/sodium salts of propionic and sorbic acids, sodium bisulfite.

EXAMPLE I

The following formulation makes a Dill type pickling powder for use in the process of the present invention. This powder has been used to prepare pickled cucumbers, corn mushrooms, green/red peppers, carrots, green tomatoes, cauliflower, beans, horseradish, sausages and wieners:

| Ingredient | as is, % |
|---|---|
| Salt, fine granulated | 51.95 |
| Lactic acid powder | 28.00 |
| (at 50% acid level, spray dried on gum arabic) | |
| Calcium chloride (dihydrate), powder | 9.35 |
| Dill, fine ground | 5.00 |
| Dry vinegar flavor | 1.50 |
| MSG | 1.50 |
| Cloves, fine ground | 0.80 |
| Marjoram, fine ground | 0.60 |
| Bay, fine ground | 0.50 |
| Basil, fine ground | 0.40 |
| Turmeric, fine ground | 0.20 |
| Syloid 200 (flow agent) | 0.20 |
| TOTAL | 100.00 |

The three most common batch sizes prepared with this formula have been one quart/liter in clean, unused, glass jars with a cap seal; one gallon in clean, unused one gallon glass and PET jar also sealed with a cap and 50 gallons in a clean, unused 55 gallon polyethylene drum firmly sealed with a matching lid.

The "packout" or product to brine packing ratio generally falls between 50% product to 50% brine and 60% product to 40% brine.

Only fresh, healthy vegetable and meat products were used in the process set forth in this example.

The following table sets forth the basic process conditions:

| BATCH SIZE | MINIMUM AMOUNT OF PICKLING POWDER USED (gs) | AMOUNT OF SOLUTION USED (liter) | PICKLING TIME (days) | TEMPERATURE (°F.) |
|---|---|---|---|---|
| 1 Qt/liter | 18.85 | NONE-added powder, the filled container with boiling water* to rim | 3–10 | 75 |
| | | | 4–12 | 40 (refrigerate) |
| 1 Gallon | 75.4 | None-added powder, the filled container with boiling water* to rim | 3–10 | 75 |
| | | | 4–12 | 40 (refrigerate) |
| 50 Gallons | 3,015 g at 60/40 ratio | 76.8 | 3–14 | Between 60 and 80 |
| | 3,770 g at 50/50 ratio | 96.0 | (to taste, fully developed) | Between 60 and 80 |

Cold water may also be used, or water between 50–212° F.

EXAMPLE II

The following formulation, when used in the process of the present invention, makes a "Polish dill" type pickle. The formulation has been used to prepare pickled cucumbers, beans, sausages, cabbage, calf tongues, horseradish, olives, and party or vegetable mixes:

| Ingredient | % |
|---|---|
| Salt, fine ground | 49.35 |
| Lactic acid powder | 26.00 |
| (at 50% acid level, spray dried on gum arabic) | |
| Calcium Chloride (dihydrate) powder | 9.35 |
| Dill, finely ground | 5.00 |
| Citric acid, anyh. | 4.00 |
| Onion powder | 1.50 |
| Glucono-delta-lactone | 1.50 |
| Maggi 122 hydrolyzed plant protein | 1.00 |
| Cloves, finely ground | 0.80 |
| Black pepper, finely ground | 0.60 |
| Bay, finely ground | 0.50 |
| Turmeric | 0.20 |
| Syloid 200 (flow agent) | 0.20 |
| TOTAL | 100.00 |

Example II products were made using the batch sizes and processing conditions described in Example I.

EXAMPLE III

In the process of the present invention, the following formulation makes a "Half sour" type pickle. This formulation has been used to prepare pickled cabbage, corn, mushrooms, beans, olives, carrots, cauliflower, gershkins, calf tongues, pig leg pieces and sausages.

| Ingredient | % |
|---|---|
| Salt, fine ground | 65.90 |
| Lactic acid powder | 15.00 |
| (at 50% acid level, spray dried on gum arabic) | |
| Calcium sulfate, anhy. | 11.50 |
| Dry vinegar flavor (Essicum) | 1.50 |
| Glucono-delta-lactone | 1.30 |
| MSG | 1.20 |
| Coriander, finely ground | 1.00 |
| Cloves, finely ground | 0.80 |
| Marjoram, finely ground | 0.60 |
| Bay, finely ground | 0.50 |
| Basil, finely ground | 0.40 |
| Turmeric, finely ground | 0.30 |
| TOTAL | 100.00 |

Example III products were made using the same batch sizes and processing conditions described in Example I.

EXAMPLE IV

The following formulation, when used in the process of the present invention, makes a "Kosher dill" type pickle. Pickled cucumbers, beans, calf tongues, sausages, wieners and pig leg pieces have been prepared with this formulation.

| Ingredient | as is, % |
|---|---|
| Salt, fine ground | 51.80 |
| Lactic acid powder | 15.55 |
| (at 50% acid level, spray dried on gum arabic) | |
| Calcium Chloride (dihydrate) powder | 9.35 |
| Citric acid, anhy. | 8.00 |
| Dill, finely ground | 4.00 |
| Dry vinegar flavor, (Essicum) | 2.50 |
| Potassium citrate | 2.00 |
| Garlic powder | 1.80 |
| Autolyzed yeast | 1.50 |
| Black pepper, finely ground | 0.80 |
| Cloves, finely ground | 1.80 |
| Celery, finely ground | 1.60 |
| Bay, finely ground | 0.50 |
| Marjoram, finely ground | 0.40 |
| Tumeric, finely ground | 1.20 |
| Syloid 200 (flow agent) | 0.20 |
| TOTAL | 100.00 |

Example IV products were prepared using the same batch sizes and processing conditions described in Example I.

EXAMPLE V

When used in the process of the present invention, the following formulation produces a "Sweet sour" type pickle. This formulation was used to prepare pickled cucumber, gershkin, cucumber relish, corn, carrot, green and red pepper, peach, apricot and green melon.

| Ingredient | as is, % |
|---|---|
| salt, finely ground | 60.57 |
| Sodium diacetate (40% acid) | 12.00 |
| Calcium sulfate, anhy. | 11.50 |
| Fumaric acid, C.W.S. (cold water soluble) | 10.00 |
| Glucono-delta-lactone | 1.30 |
| Maggi 122 hydrolyzed plant protein | 1.30 |
| Marjoram, finely ground | 1.00 |
| Coriander, finely ground | 0.80 |
| Clove, finely ground | 0.40 |
| Sodium benzoate | 0.33 |
| Bay, finely ground | 0.30 |
| Calcium saccharin | 0.30 |
| Sodium guanilate | 0.10 |
| Sodium inosinate | 0.10 |
| TOTAL | 100.00 |

Example V products were prepared using at the same batch sizes and processing conditions previously describe in Example I, except that the containers, caps and lids had each been previously used.

Pickling powders of the present invention are formulated by intimately mixing the ingredients using known methods. For example, the individual components may be ground to a suitable degree of fineness and the mixed or ground together in a mill. Alternatively, a wet method may be used wherein the ingredients are dissolved and/or suspended in water. Subsequently, this water is removed by evaporation: e.g., by spray or freeze drying. Another proven method is to add the pickling powder's components, in small quantities, to a quantity, say less than 0.5%, of a silicate flow agent, in a manner effective to evenly distribute the ingredients as the ingredients are added to the powder admixture. Each of these methods permits uniform ingredient distribution and also prevents stratification and segregation of compounds that have different densities. More particularly, following:

A. The selected ingredients are ground to or purchased with a desired particle size. The ingredients with the desired particle size are admixed with minimum amount of flow agent(s); for example, 0.2% silicate; to ensure a uniform ingredient distribution and flowability throughout manufacturing, packaging and storage.

B. The selected ingredients are dissolved and/or dispersed in water or other suitable liquid. Thereafter, the resulting solution or dispersion is then spray-dryed (with or without an applied vacuum) and the dried material is ground.

C. The particles of the selected ingredients are ground to the desired particles size (or ordered as such), slurried with water or a non-toxic solvent, agglomerated via drying, and then re-ground into a particulate form.

What is claimed is:

1. A pickle composition comprising:
   (a) cucumber;
   (b) at least about 292 ppm added calcium; and
   (c) at least 21.1 ppm eugenol wherein said eugenol is derived from spices.

2. A pickle composition comprising:
   (a) green stock;
   (b) around 530 ppm calcium; and
   (c) at least 21.1 ppm eugenol wherein said eugenol is derived from spices.

3. A non-fermentative pickling process comprising the steps of:
   (a) preparing a brine wherein said brine comprises 760 ppm or more calcium and is effective to control diffusion in and out of green stock and to firm said green stock;
   (b) placing said green stock in said brine; and
   (c) maintaining said green stock in said brine for at least three days.

4. A process according to claim 3 wherein said brine further comprises at least 0.3% of an acid.

5. A process according to claim 4 wherein said acid comprises lactic acid.

6. A process according to claim 4 wherein said acid comprises acetic acid.

7. A process according to claim 4 wherein said acid comprises lactic and acetic acid.

8. A process according to claim 3 wherein said brine further comprises at least 0.5% acid.

9. A process according to claim 3 which further comprises keeping said green stock maintained in said brine at a temperature ranging from 40 degrees Fahrenheit to 160 degrees Fahrenheit.

10. Pickled green stock pickled by the process of claim 3.

11. A non-fermentative pickling process comprising the steps of:
   (a) preparing a brine wherein said brine comprises a calcium concentration effective to control diffusion in and out of green stock and to firm said green stock and 35 ppm or more eugenol;
   (b) placing said green stock in said brine; and
   (c) maintaining said green stock in said brine for at least three days.

12. A process according to claim 11 wherein said brine further comprises at least 0.3% of an acid.

13. A process according to claim 12 wherein said acid comprises lactic acid.

14. A process according to claim 12 wherein said acid comprises acetic acid.

15. A process according to claim 12 wherein said acid comprises lactic and acetic acid.

16. A process according to claim 11 wherein said brine further comprises at least 0.5% acid.

17. A process according to claim 11 wherein said process further comprises keeping said green stock maintained in said brine at a temperature ranging from 40 degrees Fahrenheit to 160 degrees Fahrenheit.

18. Pickled green stock pickled by the process of claim 11.

19. A non-fermentative pickling process comprising the steps of:
(A) formulating a pickling powder wherein said pickling powder comprises calcium, eugenol, and an acidulent in a ratio effective to, when dispersed, yield a brine comprising at least 760 ppm calcium, 35 ppm or more eugenol, and at least 0.3% acidulent;
(B) placing a quantity green stock effective to fill between 50 and 60% of a container's volume into said container;
(C) premeasuring a quantity of said pickling powder for said container so that said premeasured quantity of pickling powder is effective to produce said brine comprising at least 760 ppm calcium, 35 ppm or more eugenol, and at least 0.3% acidulent when combined with a volume of water wherein said volume of water is between 40 and 50% of said container's volume;
(D) adding said premeasured quantity of said pickling powder to said container;
(E) filling said container with said volume of water wherein said volume of water is between 65 degrees and 212 degrees Fahrenheit;
(F) sealing said container after said green stock, said premeasured pickling powder and said volume of water have been added to said container;
(G) shaking said sealed container in a manner effective to disperse and dissolve said pickling powder in said volume of water; and
(H) storing said green stock in said sealed container for at least 72 hours.

20. Pickled green stock pickled by the process of claim 19.

* * * * *